Oct. 22, 1940.  J. H. WILSON  2,218,964
AUTOMATIC VALVE FOR TRAVELING LAWN SPRINKLERS
Filed June 17, 1939
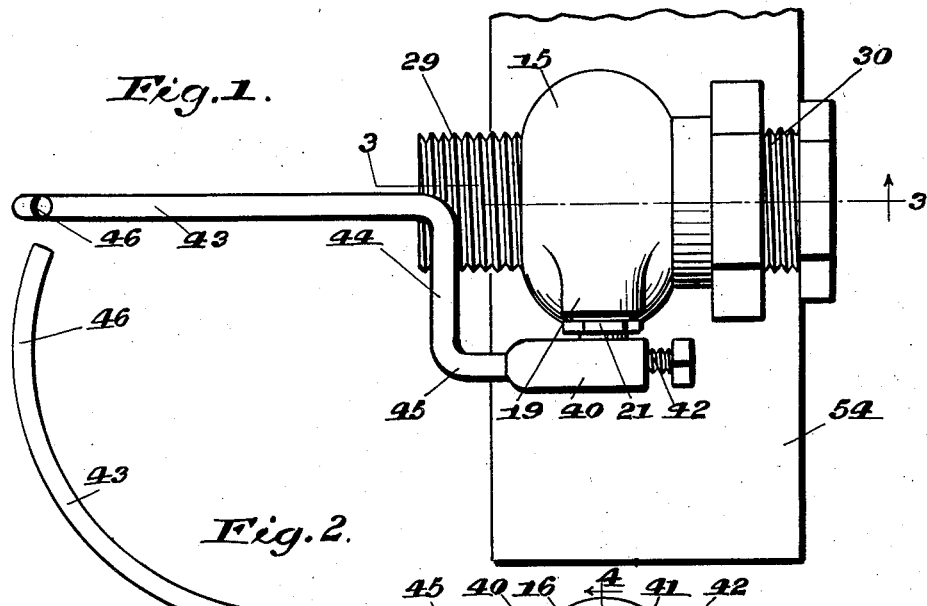
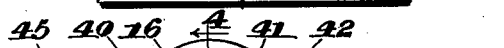
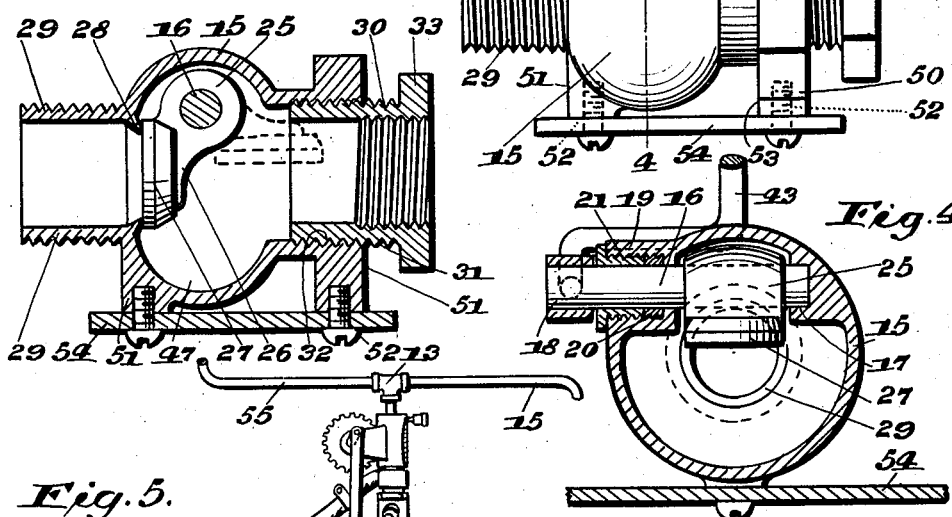
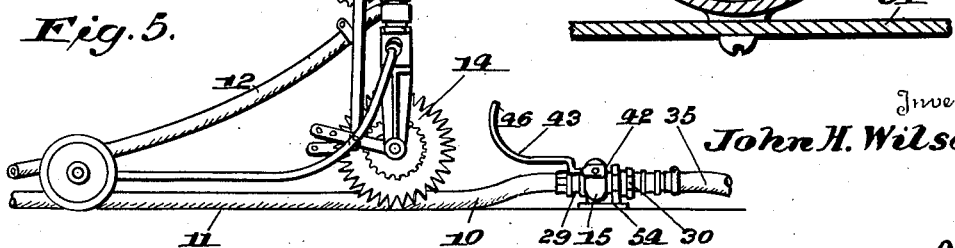
Inventor
John H. Wilson
By Munn, Anderson & Liddy
Attorney Patented Oct. 22, 1940

2,218,964

UNITED STATES PATENT OFFICE 2,218,964

AUTOMATIC VALVE FOR TRAVELING LAWN SPRINKLERS

John H. Wilson, North Platte, Nebr.

Application June 17, 1939, Serial No. 279,738

2 Claims. (Cl. 299—50)

This invention relates to an automatic valve for traveling lawn sprinklers.

An object of the invention is the provision of a valve which is adapted to be opened for connecting a source of water under pressure with a hose when a traveling sprinkler moves into engagement with an operating arm of the valve after the sprinkler has been directed along a predetermined path by a grooved wheel guided by a hose, the wheel being operated by a motor driven by water pressure from the hose.

Another object of the invention is the provision of a valve for shutting off water from a source to a hose which is connected with a motor driven by the water under pressure for causing a traveling sprinkler to move along a predetermined path determined by the position of the hose on a lawn, the valve being operated by an arm projecting into the path of the traveling sprinkler so that when the sprinkler engages the arm the valve will be closed.

A further object of the invention is the provision of a valve mounted in a casing which is connected between one end of a hose and a tubular member connected with a source of water under pressure, a shaft connected with the valve and projecting from the casing and operated by an arm which extends outwardly and longitudinally of the horizontal axis of the casing, said valve being maintained in an operative position by the weight of the projecting arm until the arm is moved to a predetermined position so that the valve will be acted on by the water pressure and be automatically closed and maintained in closed position by the pressure, a base member being provided for supporting the valve casing on a lawn.

This invention will be best understood from a consideration of the following detailed description, in view of the accompanying drawing forming a part of the specification; nevertheless, it is to be understood that the invention is not confined to the disclosure, being susceptible of such changes and modifications as define no material departure from the salient features of the invention as expressed in the appended claims.

In the drawing:

Figure 1 is a plan view of an automatic valve constructed in accordance with the principles of my invention, Figure 2 is a side view in elevation of the valve, Figure 3 is a vertical longitudinal section taken along the line 3—3 of Fig. 1, Figure 4 is a transverse vertical section taken along the line 4—4 of Fig. 2, Figure 5 is a side elevation of a traveling lawn sprinkler showing my valve in position for automatic closing operation by the traveling lawn sprinkler.

Referring more particularly to the drawing, 10 designates the inner end of a flexible hose 11 while 12 designates the outer end of the hose connected with a water motor 13 of a traveling lawn sprinkler described and claimed in my Patent No. 2,152,425, dated March 28, 1939.

The traveling lawn sprinkler includes a grooved toothed wheel 14 which is adapted to engage over a hose 11 when the hose is laid in a predetermined position on the lawn so that the grooved wheel will straddle the hose and direct the lawn sprinkler when the wheel is revolved, from a position remote from the inner end 10 towards said inner end.

A valve casing 15 is provided with an operating shaft 16 extending transversely of the casing and has a bearing at 17 in one side wall of the casing. The opposite end of the shaft, as shown at 18, projects through a bushing 19 and is located externally of the casing. A packing 20 is located within the bushing and embraces the shaft 16. A packing gland 21 is threaded into the bushing 19 and seals the casing against the loss of fluid at this point.

A sleeve 25 is secured to the shaft 16 in any approved manner and is provided with an arm 26 projecting radially and downwardly therefrom. A valve 27 is connected to the free end of the arm 26 and is located in a vertical position when in engagement with a valve seat 28 at the inner end of an externally threaded nipple 29. This valve when in open position is adapted to be located in a horizontal position as shown in Fig. 3.

A bushing 30 has external threads 31 screwed into an opening 32 which is located directly opposite the threaded nipple 29. The outer end of the bushing is provided with a flange 33 which is adapted to be engaged by a suitable tool for screwing the bushing into the casing 15. The bushing is internally threaded, as shown at 34, to receive a threaded nipple formed on the end of a tubular member 35 which is connected with a source of water under pressure. While I have shown a threaded bushing 30 for connecting the tubular member 35 to the casing 15 it will be appreciated that any form of connecting member may be employed for attaching the tubular member or hose 35 to the valve casing 15.

A bar 40 has an opening 41 to receive the shaft 16 exteriorly of the casing 15. A set screw 40 is threaded into an opening in the bar 40 for securing said bar to the shaft 16. The set screw also permits the adjustment of the bar 40 so that the valve 27 may be properly opened or closed.

A curved arm 43 extends upwardly from a rod 44 and this rod extends laterally from a rod 45 which is secured to the bar 40 or formed integrally therewith. The members 43, 44 and 45 are formed preferably from a single piece of metal. The outer end of the arm 43 is provided with a lateral extension 46. The rods 44 and 45 place the arm 43 in vertical alignment with the hose 11 so that the arm 43 or the extension 46 may be engaged by an element at the front end of the traveling conveyor shown in Fig. 5 for raising the arm and closing the valve 27, as shown in Fig. 3.

It will be noted from Fig. 3 that the casing 15 is so constructed that it forms a large chamber 47 within the casing so that the water under pressure from the hose 35 may freely pass through the casing and into the hose 11 without any restrictions.

The bottom of the casing 15 as shown more particularly in Figs. 2 and 3 is provided with feet 50 and 51 which have vertically disposed threaded openings into which threaded bolts 52 are screwed. These bolts pass through openings in bosses 53 and a plate 54. The bosses are formed integrally with the base plate 54 and engage the bottom face of the feet 50 so that when the bolts are screwed up tight, the casing will be secured to the base plate 54 which maintains the casing in position on a lawn.

The operation of my device is as follows: The traveling sprinkler sprays water from the tips or nozzles on the revolving hollow arms 55 which form part of the motor 13, as has been described in my above-named patent so that the wheel 14 is revolved and since the grooved wheel straddles the hose 11 the traveling sprinkler will move along the hose until it approaches the valve casing 15 and pulls the remaining portion of the hose along with the sprinkler. When the wheel 14 reaches the curved arm 43, said arm will be engaged by the bottom of the groove of the wheel and the curved surface of the groove in the wheel will act as a cam and force the curved arm upwardly whereby the valve 27 will be moved towards the seat 28 on the nipple 29. As the valve moves towards the seat the water pressure from the hose 35 will act on the valve and cause the valve suddenly to snap shut and maintain the valve in closed position until it is manually opened.

When the hose 11 has been reset and the traveling sprinkler is located adjacent the outer end of the hose the arm 43 is then pressed downwardly until the valve 27 is located in a horizontal position when the water will pass through the hose 11 and be forced outwardly from the nipples at the ends of the arms 55 whence the motor 13 will be revolved as will be the wheel 14 and the wheel being guided by the hose will cause the traveling sprinkler to move again towards the operating arm 43. When the grooved wheel 14 again engages the arm, the arm will be elevated and the valve 27 will be moved towards closed position. At this time the water pressure from the hose 35 will cause the valve 27 to snap into place on its seat 28 and will remain on the seat by the pressure of the water until the arm 43 is manually lowered. The weight of the arm 43 will maintain the valve 24 in an open horizontal position.

I claim:

1. In a traveling lawn sprinkler propelled by a water motor operating a traction wheel having an annular groove received by a hose supplying water under pressure from a source to the motor and guiding the wheel and sprinkler along a definite path, a valve in the hose near the source and remote from the starting position of the sprinkler, an operating arm for the valve having a free portion curved upwardly therefrom, extending toward the sprinkler and in line with the hose, said curved arm adapted to be received by the groove and be moved upwardly in the groove of the oncoming wheel for moving the valve to closed position.

2. In a traveling lawn sprinkler having a grooved toothed wheel, a water motor operating the wheel and a hose connected with the motor for conducting water under pressure to the motor, the hose cooperating with the groove in the wheel for directing the sprinkler along a predetermined path, the combination of a tubular member connected with a source of water under pressure, a valve casing on the free end of the tubular member, means connecting the free end of the hose with the casing, a valve in the casing, an operating arm connected with the valve and having a curved portion extending over and in alignment with the hose and adapted to be received by the groove in the wheel and to be moved upwardly in the groove for causing closing of the valve.

JOHN H. WILSON.